(12) United States Patent
Giles et al.

(10) Patent No.: US 7,340,172 B2
(45) Date of Patent: Mar. 4, 2008

(54) OPTICAL WDM-TDM NETWORK

(75) Inventors: Randy C. Giles, Whippany, NJ (US);
Iraj Saniee, New Providence, NJ (US);
Martin Zirngibl, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 618 days.

(21) Appl. No.: 10/411,039

(22) Filed: Apr. 10, 2003

(65) Prior Publication Data
US 2004/0202472 A1    Oct. 14, 2004

(51) Int. Cl.
*H04J 4/00* (2006.01)
*H04J 14/08* (2006.01)

(52) U.S. Cl. .............................. 398/75; 398/98; 398/99; 398/83

(58) Field of Classification Search ................. 398/75, 398/83, 98, 99, 76, 77, 78, 79, 89, 43, 66, 398/58
See application file for complete search history.

(56) References Cited

U.S. PATENT DOCUMENTS

| | | | | |
|---|---|---|---|---|
| 5,825,530 | A * | 10/1998 | Leckel et al. ............... | 359/333 |
| 6,285,810 | B1 * | 9/2001 | Fincato et al. .............. | 385/24 |
| 6,592,272 | B1 * | 7/2003 | Masucci et al. .............. | 398/47 |
| 6,665,496 | B1 * | 12/2003 | Talbot ......................... | 398/82 |
| 6,738,582 | B1 * | 5/2004 | Moshe et al. ................ | 398/98 |
| 6,792,208 | B1 * | 9/2004 | Mukherjee et al. .......... | 398/52 |
| 7,068,938 | B1 * | 6/2006 | Islam et al. .................. | 398/83 |
| 2002/0024698 | A1 * | 2/2002 | Jiang et al. .................. | 359/127 |
| 2002/0093657 | A1 * | 7/2002 | Friberg et al. ............... | 356/419 |
| 2002/0114042 | A1 * | 8/2002 | Ichibangase et al. ........ | 359/167 |
| 2004/0071469 | A1 * | 4/2004 | Baldine et al. ............... | 398/79 |

OTHER PUBLICATIONS

Kemal Bengi el. ("Efficient Qos support in a slotted multihop WDM metro ring", IEEE Journal on selected areas in communications, vol. 20, No. 1, Jan. 2002).*
Dan Sadot et al. "Tunable Optical Filters for Dense WDM Networks", IEEE Communications Magazine, Dec. 1998, pp. 50-55.*

* cited by examiner

*Primary Examiner*—M. R. Sedighian

(57) ABSTRACT

An optical WDM-TDM network includes a plurality of devices, each of the devices including at least one optical add/drop device adapted to drop optical signals of at least one channel of a plurality of received channels and pass through the remaining channels, at least one receiver, for receiving the at least one dropped channel from the at least one optical add/drop device, an aggregation device for assembling optical signals from the at least one receiver into original data formats, at least one transmitter for transmitting wavelength division multiplexed optical signals on the plurality of channels, a de-aggregation device for disassembling input data into blocks of data to be transmitted as optical signals by the at least one transmitter, and a controller for processing a global timing schedule. The plurality of devices communicate according to the global timing schedule by transmitting and receiving optical signals within bandwidth regions allocated by the global timing schedule for communication within a specific channel of the plurality of channels.

56 Claims, 6 Drawing Sheets

OPTICAL WDM-TDM NETWORK

FIELD OF THE INVENTION

This invention relates to the field of optical WDM ring networks and, more specifically, to increasing the capacity of optical WDM ring networks.

BACKGROUND OF THE INVENTION

Conventional optical ring networks comprise a plurality of nodes which are linked by optical fibers in a ring-like configuration. The ring may be designed so that data can be transmitted either clockwise or counter clockwise around the ring. Typically, each node comprises a receiver and a transmitter. The transmitter in each node produces a modulated optical signal at a wavelength which can be detected by the receiver at the adjacent downstream node, where downstream is defined as the next node in the direction of data propagation around the ring. Data is transmitted from an originating node to a destination node by passing through each intermediate node on the ring between the originating node and the destination node. At each intermediate node, the data is detected by the receiver and regenerated in optical form by the transmitter.

Various configurations and techniques have been proposed for increasing the transmission rates and capacity of optical ring networks including wavelength division multiplexing (WDM), time division multiplexing (TDM), employing multiple receivers and transmitters in the nodes, and optical ring networks with multiple parallel rings. Although these solutions do increase the capacity of optical ring networks, they are very expensive and can be wasteful of bandwidth.

In a conventional WDM ring, the capacity between a pair of nodes may be increased without making changes to other nodes in the ring, for example by adding additional wavelength channels on a given link. However, a multi-wavelength upgrade generally necessitates a temporary disruption of all traffic on the ring, while optical filters are replaced or added to accommodate the new WDM channels. Furthermore, in a WDM ring a transmitter/receiver pair is required for each connection. Thus, in a N-node ring, N(N−1) transmitter/receiver pairs are needed. As such, if the pairwise demand is below 10 Gb/s (as it often is) such a solution is wasteful in bandwidth and therefore cost ineffective.

For a traditional Synchronous Optical Network/Synchronous Digital Hierarchy (SONET/SDH) ring network employing TDM, increasing the capacity between nodes requires upgrading every node in the ring.

Furthermore, for the solutions including multiple receivers and transmitters in the nodes, and optical ring networks with multiple parallel rings, the added components increase the size of the network and add cost to the network. As such, the cost of such a solution scales linearly with the network capacity and therefore there is no economy of scale on a per bit level for larger networks. This is a problem for service providers and a hurdle for building larger networks. Also, if the data demand in a network is significantly less than what the added components can accommodate, the solution provides over-capacity and thus is not cost effective either. As such, an optical ring network is needed with increased capacity that does not increase the size of the network and does not waste available resources.

SUMMARY OF THE INVENTION

The present invention advantageously provides an optical WDM ring network with increased capacity.

In one embodiment of the present invention a method for communication in a wavelength-division-multiplexed/time-division-multiplexed communication system includes generating a timing schedule for controlling wavelength-division-multiplexed/time-division-multiplexed optical transmissions, and transmitting wavelength-division-multiplexed optical signals according to the timing schedule using a fast tunable transmitter at each node in the system to provide the wavelength-division-multiplexed/time-division-multiplexed signals.

In an alternate embodiment of the present invention a method for communication between devices of a network includes generating a global timing schedule by subdividing a total system bandwidth into time sequenced bandwidth regions, each of the bandwidth regions being associated with a single channel of a plurality of channels. The method further includes transmitting wavelength-division-multiplexed optical signals generated by at least one fast tunable transmission device on the plurality of channels within predetermined bandwidth regions allocated by the global timing schedule.

In an alternate embodiment of the present invention a method includes generating a global timing schedule by subdividing a total system bandwidth into time sequenced bandwidth regions, each of the bandwidth regions being associated with a single channel of a plurality of channels, aggregating signals received by the devices from outside the network as time-division-multiplexed optical signals according to the global timing schedule, and dropping optical signals using a tunable optical add/drop device on the plurality of channels within predetermined bandwidth regions allocated by the global timing schedule. Alternatively, the method further includes dropping optical signals from a specific one of the devices by tuning the dropping channel of a tunable optical add/drop device, during the time period of the bandwidth region allocated by the global timing schedule wherein the transmitting device transmitted its optical signal, to the channel that the intended transmitting device is configured to transmit.

In another embodiment of the present invention, a communications device includes at least one optical add/drop device adapted to drop optical signals of at least one channel of a plurality of received channels and pass through the remaining channels, at least one receiver, for receiving the at least one dropped channel from the at least one optical add/drop device, an aggregation device for assembling optical signals from the at least one receiver into original data formats, at least one transmitter, for transmitting optical signals on the plurality of channels, a de-aggregation device for disassembling input data into blocks of data to be transmitted as optical signals by the at least one transmitter and a controller for processing a global timing schedule. The communications device communicates with other such devices according to the global timing schedule by transmitting and receiving optical signals within bandwidth regions allocated by the global timing schedule for communication within a specific channel of the plurality of channels. Alternatively, the controller of the communications device is further adapted to generate the global timing schedule by subdividing a total system bandwidth into time sequenced bandwidth regions, each of the bandwidth regions being associated with a single channel of a plurality of channels, and allocating at least one bandwidth region within each time period of the time sequenced bandwidth regions for communication between the devices.

In another embodiment of the present invention, an optical WDM-TDM system includes a plurality of devices, each of the devices including at least one optical add/drop device adapted to drop optical signals of at least one channel of a plurality of received channels and pass through the remaining channels, at least one receiver, for receiving the at least one dropped channel from the at least one optical add/drop device, an aggregation device for assembling optical signals from the at least one receiver into original data formats, at least one transmitter for transmitting optical signals on the plurality of channels, a de-aggregation device for disassembling input data into blocks of data to be transmitted as optical signals by the at least one transmitter, and a controller for processing a global timing schedule. The plurality of devices communicate according to the global timing schedule by transmitting and receiving optical signals within bandwidth regions allocated by the global timing schedule for communication within a specific channel of the plurality of channels.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention advantageously provides a scalable optical WDM-TDM network with increased capacity. Although the present invention will be described within the context of an optical WDM-TDM ring network, the concepts of the present invention can be advantageously implemented in various other networks where scalability is desirable and where it is desirable to increase capacity, such as trunk, distribution, tree, star and mesh networks.

Figure 1:
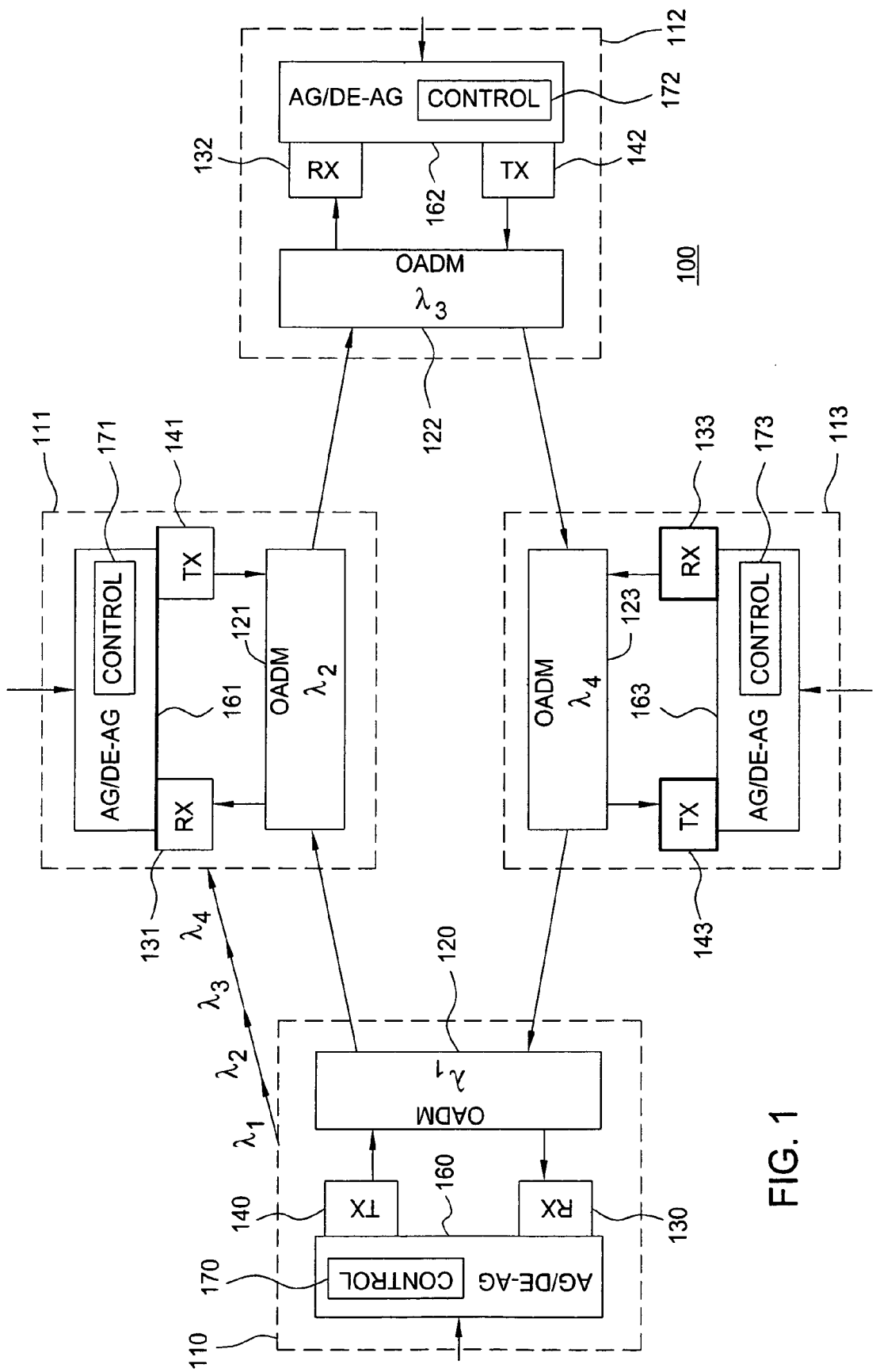
FIG. 1 depicts a high level block diagram of an embodiment of an optical WDM-TDM ring network in accordance with the present invention.

FIG. 1 depicts a high level block diagram of an embodiment of an optical WDM-TDM ring network 100 in accordance with the present invention. Although in the embodiment of FIG. 1, the optical WDM-TDM ring network 100 is depicted as comprising only one ring, the concepts of the present invention can be applied to an optical WDM-TDM ring network comprising more than one ring (e.g., a unidirectional WDM-TDM ring network).

The optical WDM-TDM ring network 100 of FIG. 1 comprises a ring 101 transmitting data (optical signals) in a clockwise direction. Ring 101 interconnects a series of four nodes 110-113. Each of the nodes 110-113 comprises a respective optical add-drop module (OADM) 120-123 configured to drop a specific wavelength channel from the wavelength division multiplexed (WDM) signal of the optical WDM-TDM ring network 100 and pass through the remaining wavelength channels. For example, and as illustrated in FIG. 1, OADM 120 in node 110 is configured to drop wavelength $\lambda_1$, OADM 121 in node 111 is configured to drop wavelength $\lambda_2$, OADM 122 in node 112 is configured to drop wavelength $\lambda_3$ and OADM 123 in node 113 is configured to drop wavelength $\lambda_4$. Each of the nodes 110-113 further comprises a respective receiver 130-133 for receiving the wavelength channel dropped by the respective OADM 120-123. The receivers 130-133 must be capable of receiving the wavelength channel dropped by its respective OADM 120-123. For example, and as illustrated in FIG. 1, the receiver 130 in node 110 must be capable of receiving wavelength $\lambda_1$, the receiver 131 in node 111 must be capable of receiving wavelength $\lambda_2$, the receiver 132 in node 112 must be capable of receiving wavelength $\lambda_3$ and the receiver 133 in node 113 must be capable of receiving wavelength $\lambda_4$. As such, in one embodiment of the present invention, the receivers 130-133 comprise broadband receivers.

Each of the nodes 110-113 further comprises a respective fast tunable transmission device (illustratively a fast tunable transmitter) 140-143. The fast tunable transmitters 140-143 of the respective nodes 110-113 each comprise a respective fast tunable laser (not shown in FIG. 1, but depicted in FIG. 2 for the first node 110 as tunable laser 150). In addition, each of the nodes 110-113 comprises a respective aggregator/de-aggregator (ag/de-ag) 160-163, the function of which will be described in detail below.

Although in the WDM-TDM ring network 100 of FIG. 1 the nodes 110-113 are depicted as comprising respective OADMs 120-123 each configured to drop (separate) a single wavelength channel per node, the concepts of the present invention may be applied to systems wherein multiple wavelength channelss are dropped within a single node. Similarly, although in the WDM-TDM ring network 100 of FIG. 1 the nodes 110-113 are depicted as comprising a single receiver and a single fast tunable transmitter, the concepts of the present invention may be applied to systems wherein a node comprises multiple receivers and/or multiple transmitters. In addition, although the fast tunable transmitters 140-143 are depicted as comprising a respective single fast tunable laser per node, the concepts of the present invention may be applied to systems wherein a fast tunable transmitter comprises more than one fast tunable laser.

Furthermore, although each of the aggregator/de-aggregators 160-163 of the present invention are depicted as comprising separate components within each of the respective nodes 110-113, the aggregator and de-aggregator functions of each of the nodes 110-113 may be respectively performed within the receivers 130-133 and the fast tunable transmitters 140-143, themselves. Alternatively, the aggregator/de-aggregators 160-163 may comprise separate components not physically located within the nodes 110-113.

Figure 2:
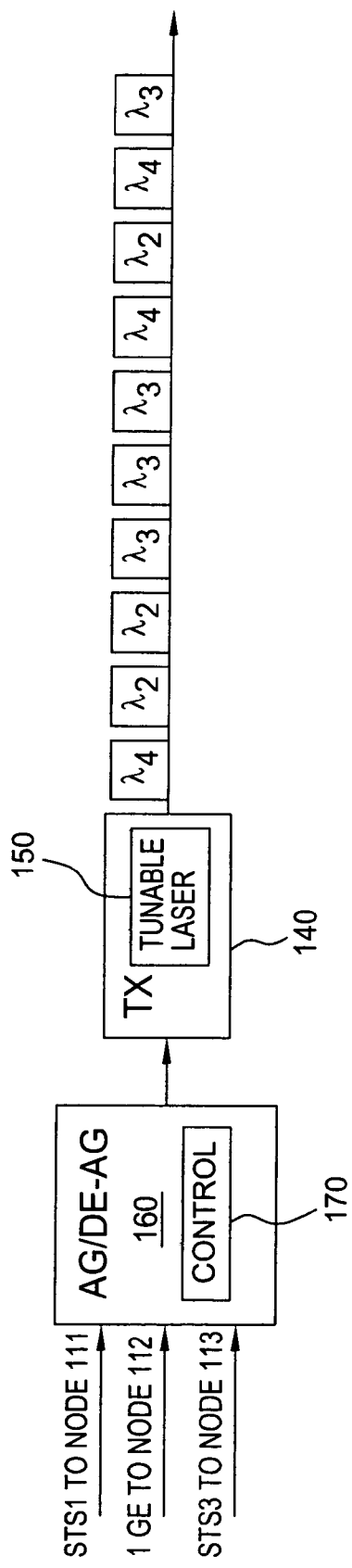
FIG. 2 graphically depicts the aggregator function of the aggregator/de-aggregators of FIG. 1.

FIG. 2 graphically depicts the aggregator function of the aggregator/de-aggregators of FIG. 1. Because the operation and structure of each of the aggregator/de-aggregators 160-163 of the nodes 110-113 is substantially similar, the operation and structure of the aggregator/de-aggregators 160-163 will be described with respect to the aggregator/de-aggregator 160 of the node 110.

The aggregator/de-aggregator 160 of the node 110 configures incoming data traffic into blocks of high speed data. For example, and as depicted in FIG. 2, an STS1 channel (50 Mb/s) intended for node 111, a 1 Gb/s Ethernet channel intended for node 112, and an STS3 channel (155 Mb/s) intended for node 113 are buffered by the aggregator/de-aggregator 160 and combined into a high speed signal (e.g. a 10 Gb/s or 40 Gb/s signal) comprising blocks of high speed data. The blocks of data are modulated at the correct wavelength channel by tuning the fast tunable laser 150 of the fast tunable transmitter 140 to the wavelength channel corresponding to the receiving wavelength channel of the node that the data is intended for, prior to modulating the data, so that the blocks of data drop out at the correct node. In FIG. 2, the aggregator/de-aggregator 160 divides a total system bandwidth into three blocks of data intended for node 111 within wavelength $\lambda_2$, four blocks of data intended for node 112 within wavelength $\lambda_3$, and three blocks of data intended for node 113 within wavelength $\lambda_4$.

The fast tunable lasers of the nodes 110-113 are each tuned by a respective controller 170-173 in the respective aggregator/deaggregators 160-163 of the nodes 110-113, described in detail below. To correctly perform its function, the fast tunable transmitter 140 operates within a global timing schedule determined by one of the controllers 170-173 in the optical WDM-TDM ring network 100 (described in detail with respect to FIG. 4 below). That is, the node 110 transmits its optical signals (data) according to a global timing schedule. In addition, to correctly perform its function, the fast tunable transmitters must be able to tune (switch) fast enough to accommodate the bit rate of the optical WDM-TDM ring network wherein it resides. For example, for a 10 Gb/s system the fast tunable transmitters must be able to tune on the order of 100 microseconds.

The de-aggregator function of the aggregator/de-aggregator 160 of FIG. 1 operates in substantially the reverse manner as the aggregator function. That is, on the receiver side of the node 110, the aggregator/de-aggregator 160 receives the high speed blocks of optical signals (data) sent from the other nodes 111-113 and, knowing the global timing schedule, reassembles the lower speed data streams into the original data formats. That is, knowing the global timing schedule, the node 110 knows what type of data was modulated at which of the wavelength channels during which time periods and reassembles the received optical signals into their original data formats. The global timing schedule is known by the respective controller 170-173 in the aggregator/deaggregators of the nodes 110-113, described in detail below. Again, the function and structure of the remaining nodes 111-113, in their respective wavelength channels, are substantially similar.

In the optical WDM-TDM ring network 100 of FIG. 1, the nodes 110-113 communicate with one another utilizing a single, distinct wavelength channel for each node. That is, for example, the first node 110 communicates with the other three nodes 111-113 by cycling its fast tunable transmitter 140 through wavelengths $\lambda_2$, $\lambda_3$, and $\lambda_4$, respectively. In the nodes 111-113, the respective OADM 121-123 separates from the combined signals, the single wavelength channel associated with that node (i.e., node 111 drops wavelength $\lambda_2$, node 112 drops wavelength $\lambda_3$, and node 113 drops wavelength $\lambda_4$) and passes through the wavelength channels not being dropped. The data configured within the dropped wavelength channel is then received by the respective receiver 131-133.

Similarly, the second node 111 communicates with the other three nodes 110, 112, and 113 by cycling its fast tunable transmitter 141 through wavelengths $\lambda_1$, $\lambda_3$, and $\lambda_4$, respectively. In the nodes 110, 112, and 113, the respective OADM 120, 122, and 123 separates from the combined signals the single wavelength channel associated with that node (i.e., node 110 drops wavelength $\lambda_1$, node 112 drops wavelength $\lambda_3$, and node 113 drops wavelength $\lambda_4$) and passes through the wavelength channels not being dropped. The data configured within the dropped wavelength channel is then received by the respective receiver 130, 132, and 133, which is configured to receive the dropped wavelength channel. The operation of the remaining nodes is, on their respective wavelength channels, substantially the same as discussed herein. All of the nodes 110-113 communicate with each other according to a global timing schedule, which is described in detail below.

In one embodiment of the present invention, the total bandwidth of each of the transmitters is shared over the multiple destinations (e.g., the nodes 110-113). That is, for example, the total bandwidth of the transmitter 140 of the node 110 is subdivided by the controller 170 among the wavelengths $\lambda_2$, $\lambda_3$, and $\lambda_4$ to communicate with the other nodes 111-113, respectively. As such, the total bandwidth of the transmitter 140 may be divided equally among the wavelengths $\lambda_2$, $\lambda_3$, and $\lambda_4$, to communicate with the nodes 111-113. In an alternate embodiment, the total bandwidth of the transmitter 140 may be apportioned unequally, thereby providing more bandwidth within the wavelength channels associated with the nodes that require greater traffic. The division of the bandwidth of the nodes 110-113 will be discussed in greater detail below with respect to the global timing schedule.

In an alternate embodiment of the present invention, the total bandwidth of each of the transmitters is shared among all of the nodes, including the transmitting node. That is, for example, the total bandwidth of the transmitter 140 of node 110 is divided among the wavelengths $\lambda_1$, $\lambda_2$, $\lambda_3$, and $\lambda_4$ to communicate with the other nodes utilizing wavelengths $\lambda_2$, $\lambda_3$, and $\lambda_4$ and to send data to itself utilizing wavelength $\lambda_1$ to check, for example, if the optical WDM-TDM ring network 100 is closed.

The global timing schedule of the present invention, referred to above, is determined by a controller in the system privy to the system information of a network wherein it resides. For example, in the WDM-TDM ring network 100 of FIG. 1, a respective controller 170-173 is located within each of the aggregator/de-aggregators 160-163 of the nodes 110-113. One of the nodes of the WDM-TDM ring network 100 is chosen as a primary node and, as such, the controller within the aggregator/de-aggregator of the primary node determines the global timing schedule for the WDM-TDM ring network 100. That is, the primary node controller generates a timing schedule for controlling the time-division-multiplexed and wavelength-division-multiplexed optical transmission of the present invention.

The controllers of the remaining nodes are, as such, not functional for determining the global timing schedule but all know and adhere to the global timing schedule. The controller within the primary node utilizes system information, such as nodal demands, to determine the global timing schedule. In alternate embodiments of the present invention, a controller for determining the global timing schedule comprises a separate component either within each of the nodes themselves and not within the aggregator/de-aggregators of the nodes, only one controller being functional to determine the global timing schedule, or as a separate single component outside of the nodes, but in communication with each of the nodes of a network.

Figure 3:
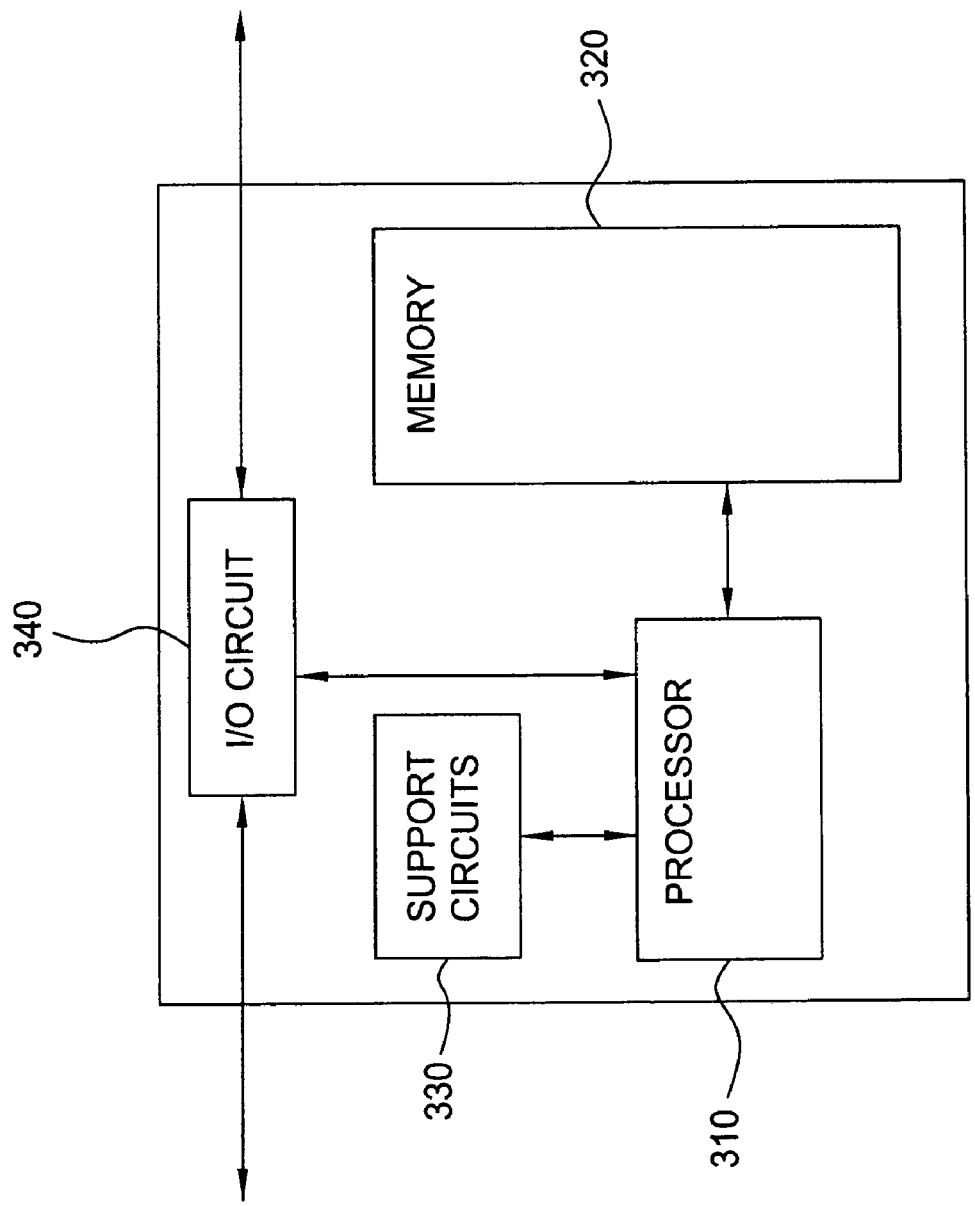
FIG. 3 depicts a high-level block diagram of an embodiment of a controller suitable for determining a global timing schedule of the optical WDM-TDM ring network of FIG. 1.

FIG. 3 depicts a high-level block diagram of an embodiment of a controller suitable for determining a global timing schedule of the optical WDM-TDM ring network 100 of FIG. 1. The controllers of the present invention are substantially similar and as such, the controller depicted in FIG. 3 is representative of all of the controllers located within the aggregator/de-aggregators of the present invention. The controller of FIG. 3 comprises a processor 310 as well as a memory 320 for buffering data and for storing information and control programs. The processor 310 cooperates with conventional support circuitry 330 such as power supplies, clock circuits, cache memory and the like as well as circuits that assist in executing the software routines stored in the memory 320. As such, it is contemplated that some of the process steps discussed herein as software processes may be implemented within hardware, for example, as circuitry that cooperates with the processor 310 to perform various steps. The controller also contains input-output circuitry 340 that forms an interface between the various functional elements communicating with the controller.

Although the controller of FIG. 3 is depicted as a general purpose computer that is programmed to perform various control functions in accordance with the present invention, the invention can be implemented in hardware, for example, as an application specified integrated circuit (ASIC) or fielded programmable gate array (FPGA). As such, the process steps described herein are intended to be broadly interpreted as being equivalently performed by software, hardware, or a combination thereof.

As discussed above, the optical WDM-TDM ring network 100 operates according to a global timing schedule determined by a controller in an aggregator/de-aggregator of a primary node. In the embodiment of the present invention of the optical WDM-TDM ring network 100 of FIG. 1, node 110 is illustratively configured as the primary node and, as such, the controller 170 in the aggregator/de-aggregator 160 determines the global timing schedule.

The controller 170 in the aggregator/de-aggregator 160 of the optical WDM-TDM ring network 100 subdivides the bandwidth of the node 110 into time sequenced bandwidth regions, each bandwidth region having associated with it a single wavelength channel. The wavelength channels within the bandwidth regions correspond to the wavelengths $\lambda_1$, $\lambda_2$, $\lambda_3$ and $\lambda_4$ used for communication between the nodes 110-113, respectively. The sum of all of the bandwidth regions is equal to the bandwidth of the node 110 plus an overhead that is required for tuning the tunable laser 150 and phase and clock recovery (for example 20% overhead if the tunable laser 150 is tuned for 200 ns and having a data block of 800 ns). That is, if the data rate within a block is 12.5 Gb/s and the blocks are 1 microsecond long, leaving 200 ns of dead time between blocks to be used for tuning and clock and phase recovery, allows for a total useful capacity of 10 Gb/s. If the global timing schedule is repeated every 100 microseconds, the 10 G bandwidth can be distributed at a granularity of 100 mb/s. As such, the aggregator/de-aggregator 160 will buffer the incoming data for at least 100 microseconds at a time. The global timing schedule is repeated to assure that the network provides SONET grade reliability and good jitter performance. The global timing schedule repeats periodically and thus, the sequencing of the wavelength channels repeats the same pattern after a certain amount of time, defined as the periodicity of the global timing schedule.

Knowing system parameters, the controller determining the global timing schedule may adjust the configuration of the global timing schedule within a periodicity to accommodate for nodal demands. That is, if a node requires more bandwidth because of traffic demands during certain time periods, the controller modifies the global timing schedule to accommodate for the nodal demands by allocating more bandwidth within the wavelength channel of communication (receiving wavelength channel) for the node having a greater nodal demand. Similarly, the controller can reduce the amount of bandwidth allocated to a node not experiencing much traffic.

Figure 4:
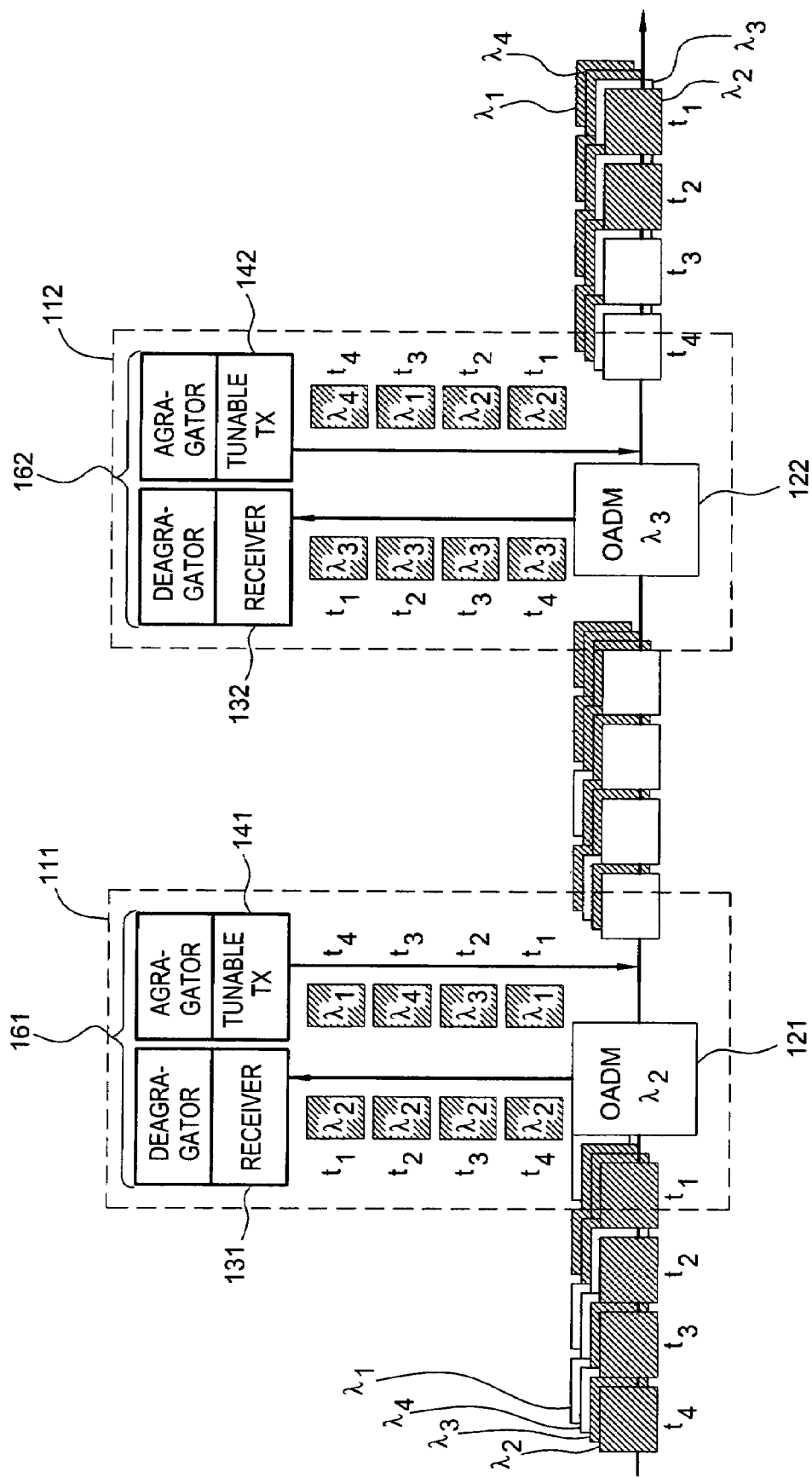
FIG. 4 graphically depicts an embodiment of data communication between two nodes of the optical WDM-TDM ring network of FIG. 1 in accordance with the present invention.

FIG. 4 graphically depicts an embodiment of data communication between two nodes 111, 112 of the optical WDM-TDM ring network 100 of FIG. 1 according to a global timing schedule of the present invention. In FIG. 4, an exemplary periodicity of a global timing schedule determined by the controller 170 of the node 110 of the optical WDM-TDM ring network 100 is depicted by four wavelength rows $\lambda_2$, $\lambda_3$, $\lambda_4$ and $\lambda_1$ and four time period columns $t_1$, $t_2$, $t_3$, and $t_4$. Each of the wavelengths $\lambda_2$, $\lambda_3$, $\lambda_4$ and $\lambda_1$ represents a wavelength channel dropped by a respective OADM 120-123 of the nodes 110-113. These are the wavelength channels used for communication between the nodes 110-113. Each of the blocks represents a bandwidth region allocated by the global timing schedule for communication between the nodes 110-113 within a specific wavelength channel. Each of the time period columns $t_1$, $t_2$, $t_3$, and $t_4$ in FIG. 4 represents the time period associated with the bandwidth regions allocated by the controller 170 for communication between the nodes.

As evident in FIG. 4, within each of the time periods $t_1$, $t_2$, $t_3$, and $t_4$ the global timing schedule allocates one bandwidth region for each of the wavelengths $\lambda_1$, $\lambda_2$, $\lambda_3$, and $\lambda_4$ required for communication between the nodes 110-113. In the embodiment of FIG. 4, the global timing schedule allocates four bandwidth regions within each of the four time periods of the global timing schedule. As such, the bandwidth of the primary node 110 is divided into time sequenced bandwidth regions; illustratively, four bandwidth regions $\lambda_2$, $\lambda_3$, $\lambda_4$ and $\lambda_1$ within each of the four time periods $t_1$, $t_2$, $t_3$, and $t_4$. All of the nodes 110-113 communicate according to the global timing schedule. However, it is considered by the inventors that all of the nodes of a network system may not have the same bandwidth capacity and as such, the global timing schedule must be determined to accommodate the most restrictive node of a network.

The darkened blocks in FIG. 4 represent bandwidth regions that already contain data. The global timing schedule ensures that the nodes 110-113 do not attempt to insert data into a bandwidth region that already contains data and that two nodes do not attempt to insert data into the same bandwidth region. Contention for access to a bandwidth region between multiple nodes may be resolved using conventional known resolving techniques, such as Round-Robin techniques or prioritizing techniques and will not be described in detail herein.

In the embodiment of FIG. 4, the OADM 121 of the node 111 passes through the bandwidth regions allocated to the wavelength rows $\lambda_1$, $\lambda_3$ and $\lambda_4$ and drops the data within the bandwidth regions allocated to the wavelength row $\lambda_2$ to be communicated to the receiver 131 and reassembled by the de-aggregator function of the aggregator/de-aggregator 161.

On the input side of the node 111, the aggregator function of the aggregator/de-aggregator 161 configures incoming data traffic into blocks of high speed data. The blocks of data are modulated at the correct wavelength channel by tuning the tunable laser of the fast tunable transmitter 141 to the desired wavelength channel before modulation so that the blocks of data are received by the node for which the data was intended. The data blocks, though, can only be transmitted to the subsequent nodes (e.g., the node 112) within available (empty) bandwidth regions in the global timing schedule corresponding to the wavelength channel of the modulated data.

For example, in FIG. 4 the data in the bandwidth regions comprising the first row $\lambda_2$ are dropped by the OADM 121 of the node 111 and communicated to the receiver 131. The bandwidth regions comprising the remaining rows $\lambda_1, \lambda_3, \lambda_4$ are passed through by the OADM 121. On the input side (data not shown being inputted) of the node 111, the data blocks configured by the aggregator/de-aggregator 161 and modulated by the transmitter 141 intended for the subsequent nodes (and possibly the node 111 itself) are inserted into empty bandwidth regions within the respective rows of the global timing schedule.

For example, in FIG. 4 during the time period $t_1$, the node 111 inserts data configured within the wavelength $\lambda_1$ intended for the node 110 into an available bandwidth region in the fourth wavelength row $\lambda_1$, during the time period $t_2$, the node 111 inserts data configured within the wavelength $\lambda_3$ intended for the node 113 into an available bandwidth region in the third wavelength row $\lambda_4$, during the time period $t_3$, the node 111 inserts data configured within the wavelength $\lambda_4$ intended for the node 112 into an available bandwidth region in the second wavelength row $\lambda_3$, and during the time period $t_4$, the node 111 inserts data configured within the wavelength $\lambda_1$ intended for the node 110 into an available bandwidth region in the fourth wavelength row $\lambda_1$. As evident in FIG. 4, data is inserted into available bandwidth regions during the time periods $t_1, t_2, t_3,$ or $t_4$ that they are available. All of the bandwidth regions of the first wavelength row $\lambda_2$ are empty after the data within those bandwidth regions are dropped by the OADM 121 of the node 111 during time periods $t_1, t_2, t_3,$ and $t_4$. The only data existing in the bandwidth regions of the first wavelength row $\lambda_2$ after being dropped by the OADM 121 is data inserted by the node 111 during transmission. All of the bandwidth regions of the four rows $\lambda_1, \lambda_2, \lambda_3,$ and $\lambda_4$ are then communicated to the subsequent node 112. That is, the subsequent node receives all of the data passed through node 111 and modulated within the node 111 and also functions according to the global timing schedule.

In the subsequent node 112, the data with the bandwidth regions comprising the second row $\lambda_3$ are dropped by the OADM 122 of the node 112 and communicated to the receiver 132. The bandwidth regions comprising the remaining rows $\lambda_1, \lambda_2,$ and $\lambda_4$ are passed through by the OADM 122. On the input side of the node 112, data blocks configured by the aggregator/de-aggregator 162 and modulated by the transmitter 142 intended for the subsequent nodes (or node 112 itself) are inserted into available bandwidth regions within the respective rows $\lambda_1, \lambda_2,$ and $\lambda_4$. For example in FIG. 4, the node 112 inserts two data blocks intended for the node 111 into two available bandwidth regions in the first row $\lambda_2$ at time periods $t_1$ and $t_2$, one data block intended for node 110 (not shown) into an available bandwidth region in the fourth row $\lambda_1$ at time period $t_3$, and one data block intended for node 113 (not shown) into an available bandwidth region in the third row $\lambda_4$ at time period $t_3$. Again, the data is inserted into the available bandwidth regions during the time period $t_1, t_2, t_3,$ or $t_4$ that they are available. All of the bandwidth regions of the second row $\lambda_3$ are empty after the data is dropped by the OADM 122 of the node 112. The only data existing in the bandwidth regions of the second wavelength row $\lambda_3$ after being dropped by the OADM 122 is data inserted by the node 112 during transmission. All of the bandwidth regions of the four rows $\lambda_1, \lambda_2, \lambda_3, \lambda_4$ are then communicated to the subsequent node 113 (not shown). The operation of all of the nodes of the optical WDM-TDM ring network 100, in their respective wavelength channels, is substantially similar. The controller 170 monitors the global timing schedule and records what data is being inserted into each of the bandwidth regions. This information is continuously distributed to each of the nodes 110-113, and as such the nodes 110-113 know the wavelength channel and the format of all of the data contained in the bandwidth regions and from which node they are being transmitted.

The global timing schedule of FIG. 4 is described as being performed sequentially by the nodes 110-113 only for clarity of explanation. In practice, the nodes 110-113 are all simultaneously functioning within the time periods of the global timing schedule. It will be appreciated by those skilled in the relevant art and informed by the teachings of the present invention, that because the timing schedule is a global timing schedule, the nodes 110-113 can insert data into available respective empty bandwidth regions during the time periods that the respective bandwidth regions are available as long as data does not already exist in a particular bandwidth region or other nodes of the system are not attempting to insert data in the same bandwidth region within the same time period. The idea is that every node on the ring knows which bandwidth regions are assigned to what wavelength channels and intended for which nodes and, as such, every node of the network system knows when to receive data and when to send its own high speed blocks of data, if bandwidth regions are available.

Figure 5:
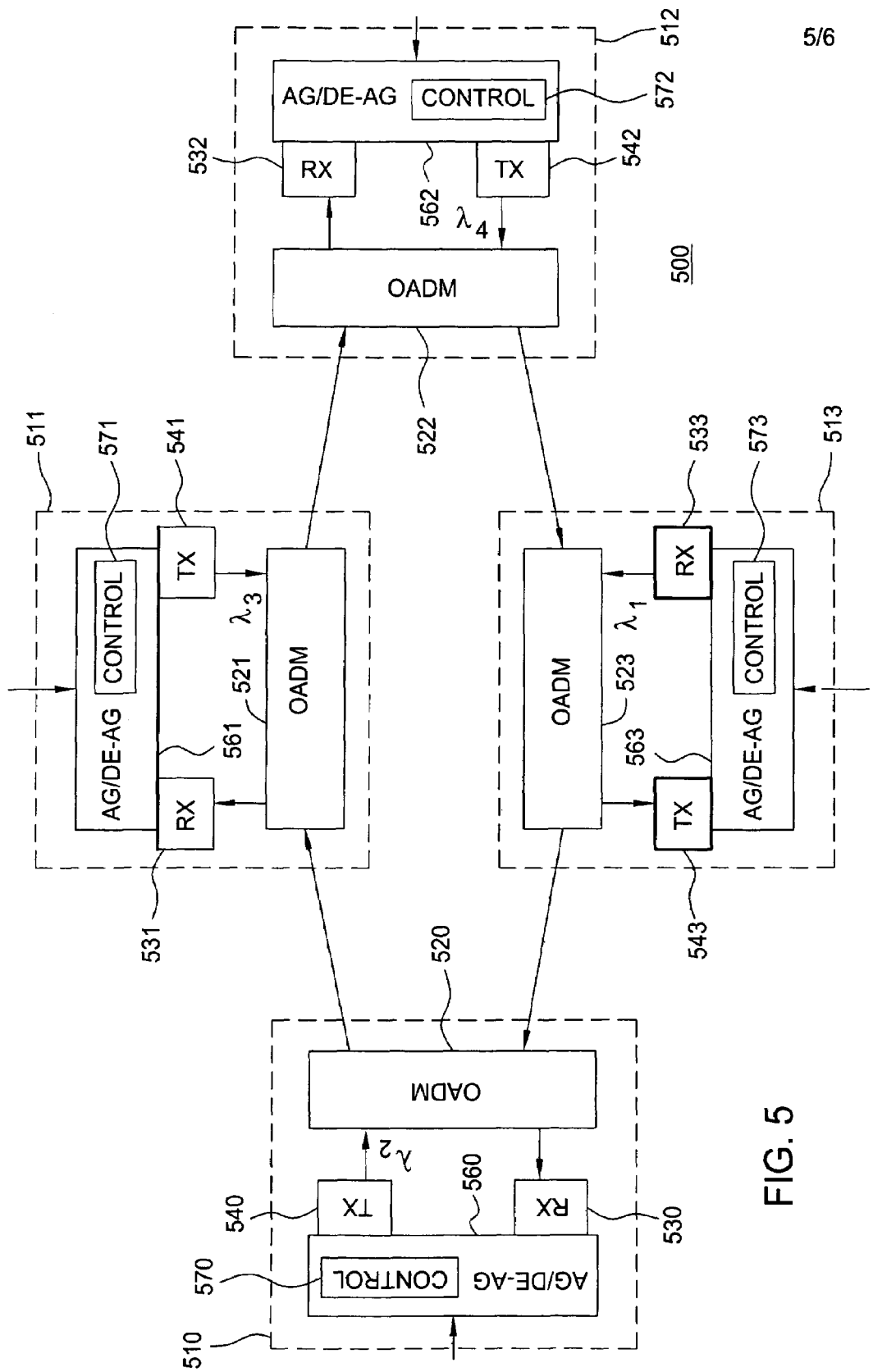
FIG. 5 depicts a high level block diagram of an alternate embodiment of an optical WDM-TDM ring network in accordance with the present invention.

FIG. 5 depicts a high level block diagram of an alternate embodiment of an optical WDM-TDM ring network in accordance with the present invention. The optical WDM-TDM ring network 500 of FIG. 5 comprises a ring 501 transmitting data in a clockwise direction. Ring 501 interconnects a series of four nodes 510-513. Each of the nodes 510-513 comprises a respective tunable optical add-drop device (illustratively an optical add/drop module (OADM)) 520-523 tuned to drop a specific wavelength channel from the wavelength division multiplexed (WDM) signal of the optical WDM-TDM ring network 500 and pass through the remaining wavelength channels.

Each of the nodes 510-513 further comprises a respective broadband receiver 530-533 capable of receiving any of the wavelength channels separated by the respective OADM 520-523. For example if the tunable OADM 520 of the node 110 separates a wavelength channel $\lambda_1$, the broadband receiver 530 in node 510 must be capable of receiving wavelength $\lambda_1$. If the tunable OADM 520 of the node 110 separates a wavelength channel $\lambda_2$, the broadband receiver 530 in node 510 must be capable of receiving the wavelength $\lambda_2$. Each of the broadband receivers 530-533 must be capable of receiving any of the wavelength channels dropped by the respective tunable OADM 520-523.

Each of the nodes 510-513 further comprises a respective fixed wavelength transmitter 540-543 and a respective aggregator/de-aggregator (ag/de-ag) 560-563, the functions of which are substantially similar to the aggregator/de-aggregators 160-163 of the optical WDM-TDM ring network 100 of FIG. 1. That is, the aggregator/de-aggregators 560-563 of the optical WDM-TDM ring network 500 configure incoming data traffic into the nodes 510-513 into blocks of high speed data. With regard to the de-aggregator function, the aggregator/de-aggregators 560-563 receive the high speed blocks of data sent from the other nodes 511-513 and, knowing a global timing schedule, reassemble the lower speed data streams into the original data formats.

Although the nodes 510-513 of the optical WDM-TDM ring network 500 of FIG. 5 are depicted as comprising tunable OADMs 520-523 configured to drop (separate) a single wavelength channel at a time, the concepts of the present invention can be applied in systems wherein multiple wavelength channels are dropped at a time by an OADM within a single node. To correctly perform their function, the tunable OADMs 520-523 must operate within a global timing schedule determined by one of the controllers 170-173 in the optical WDM-TDM ring network 100 (described in detail with respect to FIG. 4 below). That is, the tunable OADMs 520-523 must drop data according to a global timing schedule. In addition, to correctly perform its function, the tunable OADMs 520-523 must be able to tune (switch) fast enough to accommodate the bit rate of the optical WDM-TDM ring network wherein it resides. For example, for a 10 Gb/s system the tunable OADMs 520-523 must be able to tune on the order of 100 microseconds.

Furthermore, although each of the aggregator/de-aggregators 560-563 of the present invention are depicted as comprising separate components within each respective node 510-513, the aggregator and de-aggregator functions of each of the nodes 510-513 may be performed within the receivers 530-533 and the fast tunable transmitters 540-543, respectively. Also within the teachings of the present invention, the aggregator/de-aggregators 560-563 may comprise separate components not physically located within the nodes 510-513.

In the optical WDM-TDM ring network 500 of FIG. 5, the nodes 510-513 each transmit data at a single, distinct wavelength channel. That is, for example and referring to FIG. 5, the transmitter 540 of the first node 510 transmits data at a wavelength $\lambda_2$. The other three nodes 511-513 receive the data transmitted by the transmitter 540 of the first node 510 by tuning their respective tunable OADMs 521-523 to drop the wavelength $\lambda_2$ transmitted by the node 510. As such, to receive data from a specific node, the intended receiving node tunes its tunable OADM to drop the wavelength channel transmitted by the transmitting node. Illustratively, in FIG. 5, the transmitter 540 of the node 510 is configured to transmit data at wavelength $\lambda_2$, the transmitter 541 of the node 511 is configured to transmit data at wavelength $\lambda_3$, the transmitter 542 of the node 512 is configured to transmit data at wavelength $\lambda_4$, and the transmitter 543 of the node 513 is configured to transmit data at wavelength $\lambda_1$. As such, the nodes 510-513 communicate with each other by tuning their respective tunable OADM 520-523 to drop the wavelength channel transmitted by the node from which data is desired.

In accordance with the present invention, the communication between the nodes 510-513 of the optical WDM-TDM ring network 500 of FIG. 5 is performed according to a global timing schedule. The global timing schedule of the present invention is determined by a controller privy to the system information of the optical WDM-TDM ring network 500. For example, in the WDM-TDM ring network 500 of FIG. 5, a respective controller 570-573 is located within each of the aggregator/de-aggregators 560-563 of the nodes 510-513. One of the nodes of the optical WDM-TDM ring network 500 is chosen as a primary node and, as such, the controller within the aggregator/de-aggregator of the primary node determines the global timing schedule for the optical WDM-TDM ring network 500. The controllers of the remaining nodes are, as such, not functional for determining the global timing schedule. The controller within the primary node utilizes system information, such as nodal demands, to determine the global timing schedule. In alternate embodiments of the present invention, the controllers for determining the global timing schedule comprise separate components either within each of the nodes themselves and not within the aggregator/de-aggregators of the nodes, only one controller being functional to determine the global timing schedule, or as a separate single component outside of the nodes, but in communication with each of the nodes of a network.

In the embodiment of the present invention of the optical WDM-TDM ring network 500 of FIG. 5, the node 510 is illustratively chosen as the primary node and, as such, the controller 570 in the aggregator/de-aggregator 560 determines the global timing schedule. The controller 570 in the aggregator/de-aggregator 560 of the optical WDM-TDM ring network 500 subdivides the bandwidth of the node 510 into time sequenced bandwidth regions, each bandwidth region having associated with it a single wavelength channel. The global timing schedule allocates one bandwidth region for data intended for each of the nodes 510-513 during each time period within a periodicity of the global timing schedule. That is within each time period, each of the nodes 510-513 is allocated a bandwidth region for reception of data. However, each of the nodes 510-513 may only transmit data to one bandwidth region within each time period.

Figure 6:
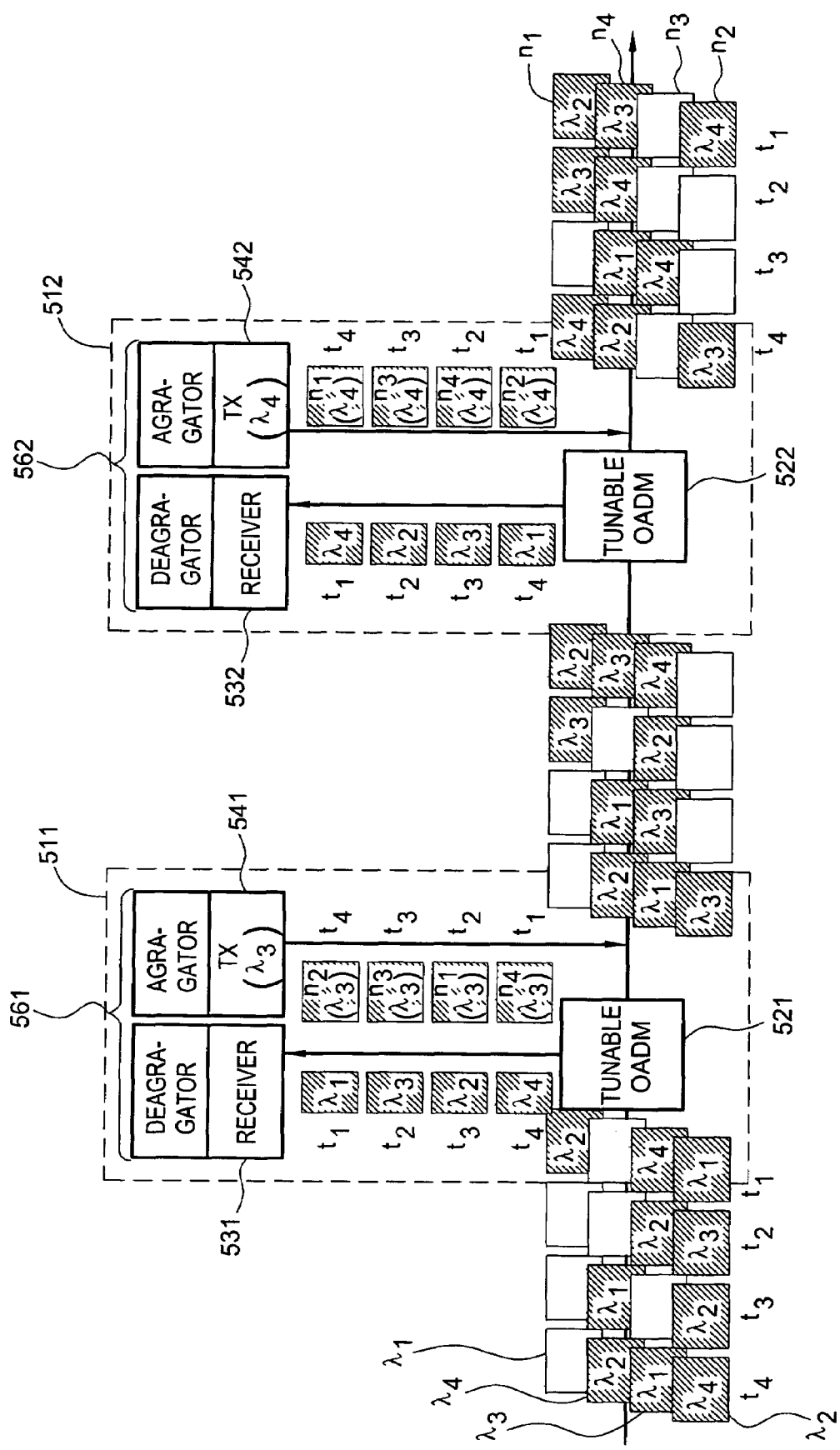
FIG. 6 graphically depicts an embodiment of data communication between two nodes of the optical WDM-TDM ring network of FIG. 5 in accordance with the present invention.

FIG. 6 graphically depicts an embodiment of data communication between two nodes 511, 512 of the optical WDM-TDM ring network 500 of FIG. 5 according to a global timing schedule of the present invention. In FIG. 6, an exemplary periodicity of a global timing schedule determined by the controller 570 of the node 510 of the optical WDM-TDM ring network 500 is depicted by four rows $n_1$, $n_2$, $n_3$ and $n_4$ and four time period columns $t_1$, $t_2$ $t_3$, and $t_4$.

Each of the rows $n_1$, $n_2$, $n_3$ and $n_4$ represents one of the nodes 510-513. Each of the blocks in FIG. 6 represents a bandwidth region allocated by the global timing schedule for transmission of data to one of the nodes 510-513. Each of the time period columns $t_1$, $t_2$ $t_3$, and $t_4$ in FIG. 6 represents the time period associated with the bandwidth regions allocated by the controller 570 for transmission of data to the nodes 510-513.

As evident in FIG. 6, within each time period $t_1$, $t_2$, $t_3$, and $t_4$, the global timing schedule allocates one bandwidth region for transmission of data to each of the nodes 510-513. Furthermore, within each time period, each of the nodes 510-513 is allocated only one bandwidth region for transmission. That is, within each time period $t_1$, $t_2$, $t_3$, and $t_4$ each node may only transmit once. As such, and as evident in FIG. 6, each of the time periods $t_1$, $t_2$, $t_3$, and $t_4$ comprises only one of each of the transmitting wavelengths $\lambda_2$, $\lambda_3$, $\lambda_4$ and $\lambda_1$ of the respective nodes 510-513. As discussed above, in the optical WDM-TDM ring network 500 of FIG. 5, each of the nodes 510-513 transmits data at a single respective wavelength $\lambda_2$, $\lambda_3$, $\lambda_4$, and $\lambda_1$ The global timing schedule allocates a bandwidth region for each of the transmitting wavelength channels during each time period within a periodicity of the global timing schedule. Based on system requirements, such as the amount of traffic required by each of the nodes 510-513, the controller 570 determines the amount of bandwidth to allocate to each of the bandwidth regions. All of the nodes 510-513 adhere to the global timing schedule determined by the controller 570 of the primary node 510 and communicate with each other according to the global timing schedule.

In the embodiment of FIG. 6, the tunable OADM 521 of the node 511 tunes its dropping wavelength channel within each time period $t_1$, $t_2$, $t_3$, and $t_4$ to correspond to the wavelength channel of the data within the bandwidth regions of the row of bandwidth regions of the data intended for it. On the input side of the node 511, the aggregator function of the aggregator/de-aggregator 561 configures incoming data traffic into blocks of high speed data. The blocks of data are modulated at a single wavelength $\lambda_3$. The node 511 may only transmit once during each of the time periods $t_1$, $t_2$, $t_3$, and $t_4$. The primary controller 570 (not shown in FIG. 4), through the global timing schedule, keeps track of what node the data modulated by the node 511 was intended for, and within what bandwidth region and during which time period the data was stored in. The data, though, may only be transmitted to the subsequent nodes (e.g., the node 512) within available (empty) bandwidth regions in the global timing schedule during available time periods. In any of the time periods $t_1$, $t_2$, $t_3$, or $t_4$, more than one transmission from any one of the nodes 510-513 may not exist. That is, during any one of the time period columns $t_1$, $t_2$, $t_3$, or $t_4$, only one of the transmitting wavelengths $\lambda_2$, $\lambda_3$, $\lambda_4$, and $\lambda_1$ of the respective nodes 510-513 may exist. That is required because during each of the time periods $t_1$, $t_2$, $t_3$, and $t_4$ each of the respective tunable OADM 520-523 of the nodes 510-513 should be tuned to drop a different wavelength channel of the transmitting wavelengths $\lambda_2$, $\lambda_3$, $\lambda_4$, and $\lambda_1$.

For example, in FIG. 6 the data in the bandwidth regions comprising the first row $n_2$ of data intended for the node 511 are dropped by the tunable OADM 521 of the node 511 and communicated to the receiver 531. The bandwidth regions comprising the remaining rows $n_1$, $n_3$, and $n_4$ are passed through by the tunable OADM 521. On the input side (data not shown being inputted) of the node 511, the data blocks configured by the aggregator/de-aggregator 561 and modulated by the transmitter 541 intended for the subsequent nodes (and possibly the node 511 itself) are inserted into empty bandwidth regions within the respective rows of the global timing schedule.

For example in FIG. 6, during the time period $t_1$, the tunable OADM 521 of the node 511 is tuned to drop the wavelength $\lambda_1$. As such, the data intended for the node 511 within the bandwidth region of the row $n_2$ within the time period $t_1$ is dropped by the tunable OADM 521 and received by the receiver 531. Similarly, during the time period $t_2$, the tunable OADM 521 of the node 511 is tuned to drop the wavelength $\lambda_3$, during the time period $t_3$, the tunable OADM 521 of the node 511 is tuned to drop the wavelength $\lambda_2$, and during the time period $t_4$, the tunable OADM 521 of the node 511 is tuned to drop the wavelength $\lambda_4$.

On the input side of the node 511, data intended for the subsequent nodes 510, 512 and 513 (or data intended for the node 511, itself) is modulated at the wavelength $\lambda_3$. The modulated data is inserted into available bandwidth regions within the row $n_1$, $n_2$, $n_3$ or $n_4$ of the respective node 510-513 for which the data is intended. For example in FIG. 6, during time period $t_1$, the node 511 inserts data configured within its transmitting wavelength $\lambda_3$ intended for the node 513 (node 4) into an available bandwidth region in the third row $n_4$, during the time period $t_2$, the node 511 inserts data configured within its transmitting wavelength $\lambda_3$ intended for the node 510 into an available bandwidth region in the fourth row $n_1$, during the time period $t_3$, the node 511 inserts data configured within its transmitting wavelength $\lambda_3$ intended for the node 512 into an available bandwidth region in the second row $n_3$, and during the time period $t_4$, the node 511 inserts data configured within its transmitting wavelength $\lambda_3$ intended for itself, node 511, into an available bandwidth region in the first row $n_2$. As evident in FIG. 6, data is inserted into available bandwidth regions during the time periods $t_1$, $t_2$, $t_3$, or $t_4$ that they are available. Also evident is that no two or more bandwidth regions within the same time period contain the same wavelength channel. Again, this is because the tunable OADM 520-523 of the nodes 510-513 must all be tuned to a different wavelength channel during a specific time period.

All of the bandwidth regions of the first row $n_2$ are empty after the data within those bandwidth regions are dropped by the tunable OADM 521 of the node 511 during time periods $t_1$, $t_2$, $t_3$, and $t_4$. The only data existing in the bandwidth regions of the first row $n_2$ after being dropped by the tunable OADM 521 is data inserted by the node 511 during transmission. All of the bandwidth regions of the four rows $n_1$, $n_2$, $n_3$, and $n_4$ are then communicated to the subsequent node 512. That is, the subsequent node 512 receives all of the data passed through node 511 and modulated within the node 511 and also functions according to the global timing schedule. In the subsequent node 512, the data within the bandwidth regions comprising the second row $n_3$ are dropped by the tunable OADM 522 of the node 512 and communicated to the receiver 532. The data within the bandwidth regions of the second row $n_3$ are dropped in a substantially similar manner as described above with respect to the node 511. The bandwidth regions comprising the remaining rows $n_1$, $n_2$, and $n_4$ are passed through by the tunable OADM 522.

On the input side of the node 512, data blocks configured by the aggregator/de-aggregator 562 and modulated by the transmitter 542 intended for the subsequent nodes (or the node 512 itself) are inserted into available bandwidth regions within the respective rows $n_1$, $n_2$, $n_3$ and $n_4$. For example in FIG. 6, during time period $t_1$, the node 512 inserts data configured within its transmitting wavelength $\lambda_4$ intended for the node 511 into an available bandwidth region in the first row $n_1$, during the time period $t_2$, the node 512 inserts data configured within its transmitting wavelength $\lambda_4$ intended for the node 513 into an available bandwidth region in the third row $n_4$, during the time period $t_3$, the node 512 inserts data configured within its transmitting wavelength $\lambda_3$ intended for itself, node 512, into an available bandwidth region in the second row $n_3$, and during the time period $t_4$, the node 512 inserts data configured within its transmitting wavelength $\lambda_4$ intended for the node 510, into an available bandwidth region in the fourth row $n_1$. All of the bandwidth regions of the second row $n_3$ are empty after the data is dropped by the tunable OADM 522 of the node 512. The only data existing in the bandwidth regions of the second row $n_3$ after being dropped by the tunable OADM 522 is data inserted by the node 512 during transmission. All of the bandwidth regions of the four rows $n_1$, $n_2$, $n_3$, and $n_4$ are then communicated to the subsequent node 513 (not shown). The function of all of the nodes 510-513 of the optical WDM-TDM ring network 500, within their respective wavelength channels, is substantially similar. The controller 570 monitors the global timing schedule and records what data is being inserted into each of the bandwidth regions. This information is continuously distributed to each of the nodes 510-513, and as such the nodes 510-513 know the wavelength channel and the intended node of all of the data contained in the bandwidth regions and if data has already been configured for a specific node within a time period.

The global timing schedule of FIG. 6 is described as being performed sequentially by the nodes 510-513 only for clarity of explanation. In practice, the nodes 510-513 are all functioning substantially simultaneously within the time periods of the global timing schedule. It will be appreciated by those skilled in the relevant art and informed by the teachings of the present invention, that because the timing schedule is a global timing schedule, the nodes 510-513 may insert data into available respective empty bandwidth regions during the time periods that the respective bandwidth regions are available as long as data does not already exist in a particular bandwidth region or other nodes of the system are not attempting to insert data in the same bandwidth region within the same time period, and that each of the nodes only transmits data once within each time period. The idea is that every node on the ring knows which bandwidth regions are intended for which nodes and, as such, every node of the network system knows when and at what wavelength channel to tune its respective tunable OADM to receive data and when to send its own high speed blocks of data, if bandwidth regions are available.

In alternate embodiments of the present invention, more than one of the tunable OADMs of the respective nodes may be tuned to drop, within the same time period, a single wavelength channel (or combination of wavelength channels) transmitted by a particular node and, as such, achieve broadcast functionality. Each of the respective OADMs may drop only a portion of the total signal or data.

Furthermore, in alternate embodiments of the present invention, the OADMs of the nodes can be broadband devices and the receivers of the nodes may be tunable. As such, the receivers of each of the nodes may be tuned to receive a particular wavelength channel transmitted by a transmitting node. As such, the global timing schedule and the nodes would function substantially similar to the embodiment of FIG. 5 and FIG. 6 described above.

The above described invention advantageously provides a method, apparatus and system that may be used to provide an inexpensive, high capacity network that is easily scalable. The concepts of the present invention may be used to take full advantage of the data demand of a network in a manner that does not provide over-capacity and is thus cost effective. Furthermore, a network in accordance with the concepts of the present invention can be configured to grow along with the demands of a network without itself having to grow linearly. As such, the above described invention provides a means for those in the art to develop high-speed, high capacity, scalable networks that are cost effective and scalable.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method for communication in a wavelength-division-multiplexed/time-division-multiplexed communication system including a plurality of nodes, comprising:
generating a timing schedule for controlling wavelength-division-multiplexed/time-division-multiplexed optical transmissions; and
transmitting wavelength-division-multiplexed optical signals according to the timing schedule using a fast tunable transmitter at each node in said system to provide the wavelength-division-multiplexed/time-division-multiplexed signals;
wherein said timing schedule is generated by a controller by subdividing a total system bandwidth into time sequenced bandwidth regions, each of said bandwidth regions being associated with a respective channel of a plurality of channels;
said timing schedule allocating at least one bandwidth region within each time period of said time sequenced bandwidth regions for communication among the nodes in the system; and
wherein information of said timing schedule including channel allocations and destination nodes for all data within said bandwidth regions is provided to each node to allow each node to receive and transmit data based on said information.

2. The method of claim 1, wherein the fast tunable transmitters switch wavelength on the order of every 100 microseconds and switching is achieved on the order of 100 nanoseconds.

3. The method of claim 1, wherein each fast tunable transmitter provides multiple synchronous connections to multiple optical receivers over said wavelength-division-multiplexed/time-division-multiplexed communication system.

4. A method of communication between devices of a network, comprising:
generating a global timing schedule, comprising;
subdividing a total system bandwidth into time sequenced bandwidth regions, each of said bandwidth regions being associated with a respective channel of a plurality of channels;
said global timing schedule allocating at least one bandwidth region within each time period of said time sequenced bandwidth regions for communication between said devices; and
transmitting wavelength-division-multiplexed optical signals generated by at least one fast wavelength-tunable transmission device on said plurality of channels within predetermined bandwidth regions allocated by said global timing schedule;
wherein information of said global timing schedule including channel allocations and destination nodes for all data within said bandwidth regions is provided to each node to allow each node to receive and transmit data based on said information.

5. The method of claim 4, wherein said bandwidth regions are allocated according to system requirements.

6. The method of claim 5, wherein system requirements comprise the number of optical signals to be processed by each of the devices.

7. The method of claim 4, wherein each of said devices is configured to drop optical signals on different channels.

8. The method of claim 7, wherein each of said devices comprises a fast wavelength-tunable transmitter and each of said devices transmits optical signals to a specific one of said devices by tuning the transmitting channel of its fast tunable transmitter to the channel that the intended receiving device is configured to drop.

9. The method of claim 7, wherein said global timing schedule allocates one bandwidth region for each of the dropping channels of said devices within each time period of said global timing schedule.

10. The method of claim 4, wherein said optical signals are transmitted within available ones of the bandwidth regions allocated by said global timing schedule.

11. The method of claim 10, wherein available ones of the bandwidth regions allocated by the global timing schedule are bandwidth regions that do not already contain optical signals inserted by said devices.

12. The method of claim 4, wherein said plurality of channels comprises the dropping channels of said devices.

13. The method of claim 4, wherein said fast wavelength-tunable transmitter device comprises a fast wavelength-tunable laser.

14. A method for communication in a wavelength-division-multiplexed/time-division-multiplexed communication system including a plurality of nodes, comprising:
generating a timing schedule for controlling wavelength-division-multiplexed/time-division-multiplexed optical transmissions;
time-division-multiplexing a plurality of signals received by a node according to the timing schedule using an aggregator; and
receiving optical signals at the node on a plurality of channels at predetermined time periods according to the timing schedule using at least one wavelength-tunable optical add/drop device;
wherein said timing schedule is generated by a controller by subdividing a total system bandwidth into time sequenced bandwidth regions, each of said bandwidth regions being associated with a respective channel of a plurality of channels;
said timing schedule allocating at least one bandwidth region within each time period of said time sequenced bandwidth regions for communication among the nodes in the system; and
wherein information of said timing schedule including channel allocations and destination nodes for all data within said bandwidth regions is provided to each node to allow each node to receive and transmit data based on said information.

15. The method of claim 14, wherein said at least one fast tunable optical add/drop device provides multiplexing on the order of 100 microseconds.

16. A method of communication between devices of a network, comprising:
generating a global timing schedule, comprising:
subdividing a total system bandwidth into time sequenced bandwidth regions, each of said bandwidth regions being associated with a respective channel of a plurality of channels;
said global timing schedule allocating at least one bandwidth region within each time period of said time sequenced bandwidth regions for communication between said devices;
wherein information of said timing schedule including channel allocations and destination nodes for all data within said bandwidth regions is provided to each node to allow each node to receive and transmit data based on said information;
aggregating signals received by said devices from outside the network as time-division-multiplexed optical signals according to said global timing schedule; and
dropping optical signals at each of said device using a tunable optical add/drop device comprising a receiver capable of receiving signals in one or more of said plurality of channels within predetermined bandwidth regions allocated by said global timing schedule.

17. The method of claim 16, wherein said bandwidth regions are allocated according to system requirements.

18. The method of claim 17, wherein system requirements comprise the number of optical signals to be processed by each of the devices.

19. The method of claim 16, wherein each of said devices is configured to transmit optical signals on different channels.

20. The method of claim 19, wherein each of said devices comprises a tunable optical add/drop device and each of said devices drops optical signals from a specific one of said devices by tuning the dropping channel of its tunable optical add/drop device, during the time period of the bandwidth region allocated by the global timing schedule wherein a transmitting device transmitted its optical signal, to the channel that the intended transmitting device is configured to transmit.

21. The method of claim 19, wherein said global timing schedule allocates one bandwidth region for each of the transmitting channels of said devices within each time period of said global timing schedule and allocates one bandwidth region for reception by each of said devices with each of said time periods.

22. The method of claim 16, wherein said plurality of channels comprises the transmitting channels of said devices.

23. The method of claim 16, wherein said tunable optical add/drop device comprises a tunable optical add/drop module (OADM).

24. A communications device in a communication system, comprising:
at least one optical add/drop device adapted to drop optical signals of at least one channel of a plurality of received channels and pass through the remaining channels;
at least one receiver, for receiving said at least one dropped channel from said at least one optical add/drop device;
an aggregation device for reassembling optical signals from said at least one receiver into original data formats;
at least one transmitter, for transmitting optical signals on said plurality of channels;
a de-aggregation device for disassembling input data into blocks of data to be transmitted as optical signals by said at least one transmitter; and
a controller for generating a global timing schedule by:
subdividing a total system bandwidth into time sequenced bandwidth regions, each of said bandwidth regions being associated with a respective channel of a plurality of channels; and
allocating at least one bandwidth region within each time period of said time sequenced bandwidth regions for communications with and among all communications devices in said system;
wherein each of said communications devices receives information of said global timing schedule including channel allocations and destination devices for all data within said bandwidth regions, and each of said communications devices receives and transmits data based on said information.

25. The communications device of claim 24, wherein said bandwidth regions are allocated by said controller according to system requirements.

26. The communications device of claim 24, wherein said aggregation device and said de-aggregation device comprise an aggregator/de-aggregator.

27. The communications device of claim 24, wherein the at least one optical add/drop device of said communications device and optical add/drop devices of other communications devices are each configured to drop optical signals on different channels.

28. The communications device of claim 27, wherein said at least one transmitter comprises at least one fast wavelength-tunable transmitter.

29. The communications device of claim 28, wherein said at least one fast tunable transmitters switch wavelength on the order of every 100 microseconds and switching is achieved on the order of 100 nanoseconds.

30. The communications device of claim 27, wherein said device transmits optical signals to a specific one of other communications devices by tuning the transmitting channel of said at least one fast tunable transmitter to the channel that an intended receiving device is configured to drop.

31. The communications device of claim 27, wherein said global timing schedule allocates one bandwidth region for each of the dropping channels of said communications device and said other communications devices within each time period.

32. The communications device of claim 24, wherein said communications device and other communications devices are each configured to transmit data on a different channel according to said global timing schedule.

33. The communications device of claim 32, wherein said at least one optical add/drop device comprises a wavelength-tunable optical add/drop module (OADM).

34. The communications device of claim 32, wherein said communications device receives optical signals from a specific one of said other communications devices by tuning the dropping channel of said tunable OADM, during the time period of the bandwidth region allocated by the global timing schedule wherein the specific one of said other communications devices transmitted its optical signal, to the channel that the specific one of said other communications devices is configured to transmit.

35. The communications device of claim 32, wherein said global timing schedule allocates one bandwidth region for each of the transmitting channels of said communications devices within each time period of said global timing schedule and allocates one bandwidth region for reception by each of said communications devices with each of said time periods.

36. The communications device of claim 24, wherein said receiver comprises a broadband receiver.

37. The communications device of claim 24, wherein said optical add/drop device comprises an optical add/drop module (OADM).

38. The communications device of claim 24, wherein said communications device and said other communications devices transmit optical signals within available ones of the bandwidth regions allocated by said global timing schedule.

39. A wavelength-division-multiplexed/time-division-multiplexed system, comprising:
   a plurality of devices, each of said devices comprising;
      at least one optical add/drop device adapted to drop optical signals of at least one channel of a plurality of received channels and pass through the remaining channels;
      at least one receiver, for receiving said at least one dropped channel from said at least one optical add/drop device;
      an aggregation device for reassembling optical signals from said at least one receiver into original data formats;
      at least one transmitter, for transmitting optical signals on said plurality of channels;
      a de-aggregation device for disassembling input data into blocks of data to be transmitted as optical signals by said at least one transmitter; and
      a controller for processing a global timing schedule;
   wherein said plurality of devices communicate according to the global timing schedule by transmitting and receiving optical signals within bandwidth regions allocated by the global timing schedule for communication within a specific channel of said plurality of channels; and
   a primary controller for generating said global timing schedule by:
      subdividing a total system bandwidth into time sequenced bandwidth regions, each of said bandwidth regions being associated with a respective channel of said plurality of channels; and
      allocating at least one bandwidth region within each time period of said time sequenced bandwidth regions for communication between said plurality of devices;
   said primary controller further providing, to each of said plurality of devices, information of said global timing schedule including channel allocations and destination devices for all data within said bandwidth regions.

40. The wavelength-division-multiplexed/time-division-multiplexed system of claim 39, wherein said bandwidth regions are allocated by said primary controller according to system requirements.

41. The time-division-multiplexed/wavelength-division-multiplexed system of claim 39, wherein each of said at least one optical add/drop devices of said plurality of devices is configured to drop optical signals on a different channel.

42. The wavelength-division-multiplexed/time-division-multiplexed system of claim 41, wherein each of said at least one transmitters of said plurality of devices comprises at least one fast wavelength-tunable transmitter.

43. The wavelength-division-multiplexed/time-division-multiplexed system of claim 42, wherein said at least one fast tunable transmitters switch wavelength on the order of every 100 microseconds and switching is achieved on the order of 100 nanoseconds.

44. The wavelength-division-multiplexed/time-division-multiplexed system of claim 41, wherein each of said plurality of devices transmits optical signals to a specific one of the plurality of devices by tuning the transmitting channel of its said at least one fast tunable transmitter to the specific channel that an intended receiving device is configured to drop.

45. The wavelength-division-multiplexed/time-division-multiplexed system of claim 41, wherein said global timing schedule allocates one bandwidth region for each of the dropping channels of the optical add/drop devices of each of said plurality of devices within each time period.

46. The wavelength-division-multiplexed/time-division-multiplexed system of claim 41, wherein each of said at least one optical add/drop devices of said plurality of devices comprises an optical add/drop module (OADM).

47. The wavelength-division-multiplexed/time-division-multiplexed system of claim 39, wherein each of said plurality of devices is configured to transmit optical signals on a different channel.

48. The wavelength-division-multiplexed/time-division-multiplexed system of claim 47, wherein each of said at least one optical add/drop devices of said plurality of devices comprises a wavelength-tunable optical add/drop module (OADM).

49. The wavelength-division-multiplexed/time-division-multiplexed system of claim 48, wherein each of said plurality of devices receives optical signals from a specific one of said plurality of devices by tuning the dropping channel of its at least one tunable OADM, during the time period of the bandwidth region allocated by the global timing schedule wherein the specific one transmitting device transmitted its optical signal, to the channel that the specific one transmitting device is configured to transmit.

50. The wavelength-division-multiplexed/time-division-multiplexed system of claim 47, wherein said global timing schedule allocates one bandwidth region for each of the transmitting channels of said devices within each time period of said global timing schedule and allocates one bandwidth region for reception by each of said devices with each of said time periods.

51. The wavelength-division-multiplexed/time-division-multiplexed system of claim 39, wherein each of said at least one receiver of said plurality of devices comprises a broadband receiver.

52. The wavelength-division-multiplexed/time-division-multiplexed system of claim 39, wherein said plurality of devices transmit optical signals within available ones of the bandwidth regions allocated by said global timing schedule.

53. The wavelength-division-multiplexed/time-division-multiplexed system of claim 39, wherein each of said plurality of devices is configured to transmit optical signals on a different channel.

54. The wavelength-division-multiplexed/time-division-multiplexed system of claim 53, wherein each of said at least one receiver of said plurality of devices comprises a tunable receiver and each of said at least one optical add/drop device of said plurality of devices comprises a broadband optical add/drop module (OADM).

55. The wavelength-division-multiplexed/time-division-multiplexed system of claim 54, wherein each of said plurality of devices receives optical signals from a specific one of said plurality of devices by tuning the receiving channel of its at least one tunable receiver, during the time period of the bandwidth region allocated by the global timing schedule wherein a specific one transmitting device transmitted its optical signal, to the channel that the specific one transmitting device is configured to transmit.

56. The wavelength-division-multiplexed/time-division-multiplexed system of claim 53, wherein said global timing schedule allocates one bandwidth region for each of the transmitting channels of said devices within each time period of said global timing schedule and allocates one bandwidth region for reception by each of said devices with each of said time periods.

* * * * *